US009250657B2

(12) United States Patent
Kim et al.

(10) Patent No.: US 9,250,657 B2
(45) Date of Patent: Feb. 2, 2016

(54) FOLDABLE DISPLAY

(71) Applicant: Samsung Display Co., Ltd., Yongin-si, Gyeonggi-do (KR)

(72) Inventors: Sang-Woon Kim, Daegu (KR); Kang-Pyo Hong, Daegu (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/502,181

(22) Filed: Sep. 30, 2014

(65) Prior Publication Data

US 2015/0331453 A1 Nov. 19, 2015

(30) Foreign Application Priority Data

May 19, 2014 (KR) .................. 10-2014-0059680

(51) Int. Cl.
| | |
|---|---|
| *H04N 1/04* | (2006.01) |
| *G06F 1/16* | (2006.01) |
| *H04N 1/00* | (2006.01) |
| *G06F 3/041* | (2006.01) |
| *G09G 5/00* | (2006.01) |
| *G09G 5/377* | (2006.01) |

(52) U.S. Cl.
CPC ............ *G06F 1/1652* (2013.01); *G06F 3/0412* (2013.01); *G09G 5/006* (2013.01); *G09G 5/377* (2013.01); *H04N 1/00129* (2013.01); *H04N 1/00236* (2013.01); *G09G 2340/10* (2013.01); *G09G 2354/00* (2013.01)

(58) Field of Classification Search
CPC ..................................................... G06F 1/1652
USPC ......................................... 358/474, 482, 498
See application file for complete search history.

(56) References Cited

U.S. PATENT DOCUMENTS

| | | | | |
|---|---|---|---|---|
| 5,734,513 A | * | 3/1998 | Wang ................... | G02B 25/002 345/32 |
| 7,705,799 B2 | * | 4/2010 | Niwa .............................. | 345/1.1 |
| 2007/0097094 A1 | * | 5/2007 | Prados et al. .................. | 345/173 |
| 2014/0055831 A1 | * | 2/2014 | Johnson ........................ | 359/238 |

FOREIGN PATENT DOCUMENTS

| | | |
|---|---|---|
| JP | 2006-295837 A | 10/2006 |
| KR | 10-2012-0032659 A | 4/2012 |

* cited by examiner

*Primary Examiner* — Houshang Safaipour
(74) *Attorney, Agent, or Firm* — Knobbe Martens Olson & Bear LLP

(57) ABSTRACT

A foldable display device is disclosed. In one aspect, the foldable display includes a display substrate, a data driver detachably connected to the display substrate, and a controller unit configured to control the data driver and detachably connected to the data driver. The display substrate includes a substrate body, a display element disposed on a first surface of the substrate body, and a transparency adjusting layer configured to adjust transparency of the display substrate and disposed on a second surface of the substrate body, wherein the first and second surfaces are opposing each other.

20 Claims, 15 Drawing Sheets

FOLDABLE DISPLAY

CROSS-REFERENCE TO RELATED APPLICATION

This application claims priority to and the benefit of Korean Patent Application No. 10-2014-0059680, filed on May 19, 2014, with the Korean Intellectual Property Office, the disclosure of which is incorporated herein in its entirety by reference.

BACKGROUND

1. Field

The described technology generally relates to a foldable display.

2. Description of the Related Art

Recently, there has been a growing interest in the development of flexible displays where the display panel can be bent. These displays can be provided in a folded or curved form so as to be used in many different applications. They include a display element provided on a flexible substrate.

The flexible display can be implemented as an organic light-emitting diode (OLED) display, a liquid crystal display (LCD), and an electrophoretic display (EPD) and the like. Among these, the OLED display has high flexibility because it can be manufactured to have a thin film laminated structure, and thus the OLED display has been drawing attention as the display technology of choice.

The flexible display can be designed as a rollable display where the display panel can be rolled depending on the bendability, a foldable display where the display panel can be folded like paper, and a stretchable display where the display panel can be stretched and contracted to adjust the size.

Among these, the foldable display is easy to carry around when folded and can realize a large sized screen when spread out, and thus has drawn attention as the next generation larger screen display device.

SUMMARY OF CERTAIN INVENTIVE ASPECTS

One inventive aspect is a display device including a display substrate designed to be folded along a folding line, a driver detachably connected to the display substrate, a transparency adjusting layer capable of adjusting transparency of the display substrate.

Another aspect is a display device that can include: a display substrate capable of being folded along a folding line; a driver detachably coupled to the display substrate; and a user controller detachably coupled to and electrically connected to the driver, wherein the display substrate includes: a substrate body; a display element disposed on one surface of the substrate body; and a transparency adjusting layer disposed on the other side of the substrate body.

The display substrate can be folded along the folding line and engaged with the driver.

The display substrate can be spread and engaged with the driver.

The display substrate can emit light to both sides.

The display element can be an organic light emitting diode.

The transparency adjusting layer can include liquid crystal molecules.

The user controller can include at least one control switch.

The control switch includes an on-off switch and a transparency adjusting switch.

The user controller can further include at least one of a camera, a communication device, a speaker, and an earphone hole.

The user controller can include a operating unit, a communication unit, and a memory.

The display device can further include a fixing clip having a communication unit configured to communicate with the user controller and a slot for fixing the display substrate.

The fixing clip can include a finger print recognition unit and the memory of the user controller stores finger print information of a user.

The display substrate can further include a film scanner disposed on the substrate body.

The display substrate can include a touch screen panel.

The film scanner can produce scanning information, the touch screen panel can produce touch information, and the user controller can receive the scanning information and the touch information and combine the scanning information and the touch information.

Another aspect is a foldable display comprising a foldable display substrate, a data driver detachably connected to the display substrate, and a controller unit configured to control the data driver and detachably connected to the data driver. The display substrate comprises a substrate body, a display element disposed on a first surface of the substrate body, and a transparency adjusting layer configured to adjust transparency of the display substrate and disposed on a second surface of the substrate body, wherein the first and second surfaces are opposing each other.

In the above display, the display substrate is further configured to be engaged with the data driver.

In the above display, the display substrate is further configured to be unfolded and engaged with the data driver.

In the above display, the display substrate is further configured to transmit light via the two opposing surfaces thereof.

In the above display, the display element comprises an organic light-emitting diode (OLED).

In the above display, the transparency adjusting layer comprises liquid crystal molecules.

In the above display, the controller unit includes at least one control switch. In the above display, the control switch comprises an on-off switch and a transparency adjusting switch.

In the above display, the controller unit comprises at least one of a camera, a communication device, a speaker, and an earphone hole.

In the above display, the controller unit comprises an operating unit, a first communication unit, and a memory.

The above display further comprises a fixing clip including a second communication unit configured to communicate data with the controller unit and a slot so as to fix the ends of the display substrate together.

In the above display, the fixing clip comprises a fingerprint recognition unit, wherein the memory of the controller unit stores fingerprint information of a user.

In the above display, the display substrate further comprises a film scanner disposed on the substrate body and configured to scan an image.

In the above display, the display substrate comprises a touch screen panel.

In the above display, the film scanner is configured to generate scanning information based on the scanned image, wherein the touch screen panel is configured to generate touch information based on objects drawn on the touch screen panel, and wherein the controller unit is configured to i) receive the scanning information and the touch information and ii) combine the scanning information and the touch information so as to display a combined image.

Another aspect is a foldable display comprising a foldable display substrate, a driver configured to drive and detachably connected to the display substrate, and a controller configured to control the driver and detachably connected to the driver. The foldable display substrate comprises a touch screen panel configured to generate touch information based on a user's touch, and a film scanner configured to scan an image placed below the display substrate and generate scanning information. The controller is further configured to receive and combine the scanning and touch information so as to display a combined image on the touch screen panel.

In the above display, the display substrate further comprises a substrate body, a display element disposed on a first surface of the substrate body, and a transparency adjusting layer configured to adjust transparency of the display substrate and disposed on a second surface of the substrate body, wherein the first and second surfaces are opposing each other.

In the above display, the display element comprises an organic light-emitting diode (OLED), wherein the transparency adjusting layer comprises liquid crystal molecules.

The above display further comprises a fixing clip that includes i) a communication unit configured to communicate data with the controller and ii) a slot so as to fix ends of the display substrate together.

In the above display, the fixing clip comprises a fingerprint recognition unit, wherein the memory of the controller stores fingerprint information of a user.

In at least one of the disclosed embodiments, the display device can be easy to carry around and can realize a large screen.

In at least one of the disclosed embodiments, the display device can adjust transparency of the display substrate.

DETAILED DESCRIPTION OF CERTAIN INVENTIVE EMBODIMENTS

Figure 1:
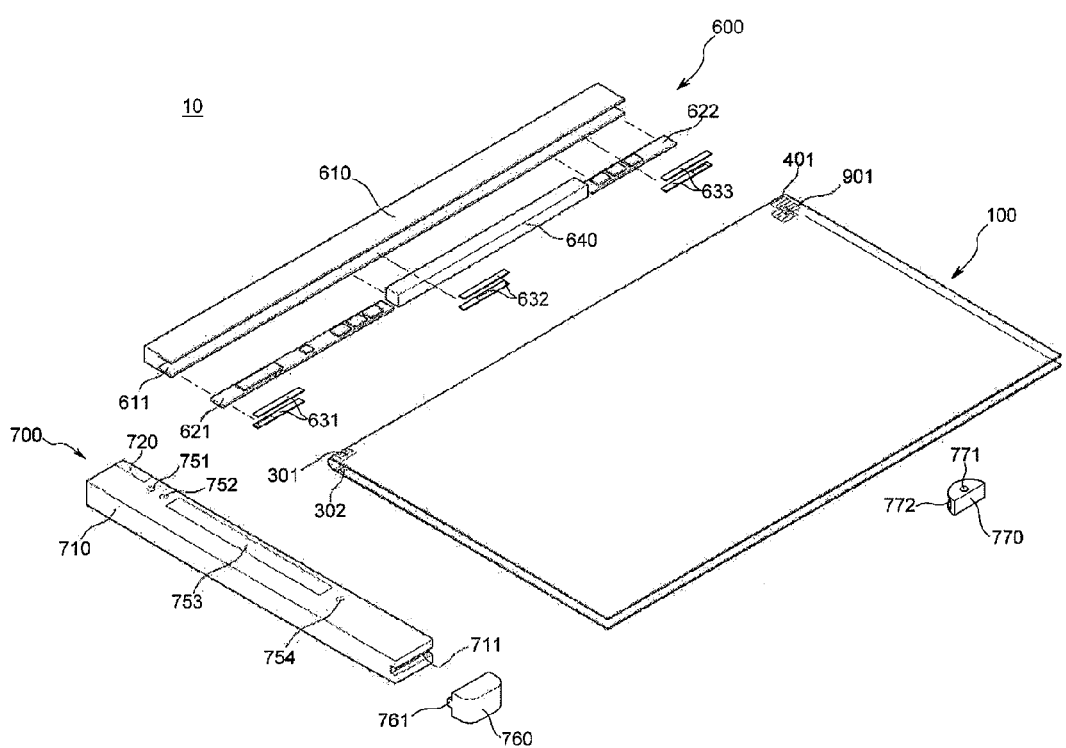
FIG. 1 is an exploded perspective view illustrating a display device according to a first embodiment.

Hereinafter, embodiments of the described technology will be described in more detail with reference to the accompanying drawings.

Although the described technology can be modified in various manners and have several embodiments, specific embodiments are illustrated in the accompanying drawings and will be mainly described in the specification. However, the scope of the embodiments is not limited to the specific embodiments and should be construed as including all the changes, equivalents, and substitutions included in the spirit and scope of the described technology.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like can be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Some of the parts which are not associated with the description may not be provided in order to specifically describe embodiments, and like reference numerals refer to like elements throughout the specification.

In addition, when a layer or element is referred to as being "on" another layer or element, the layer or element can be directly on the other layer or element, or one or more intervening layers or elements can be interposed therebetween. In this disclosure, the term "substantially" includes the meanings of completely, almost completely or to any significant degree under some applications and in accordance with those skilled in the art. Moreover, "formed on" can also mean "formed over." The term "connected" can include an electrical connection.

Hereinafter, a first embodiment will be described with reference to FIGS. 1 to 13.

Figure 2:
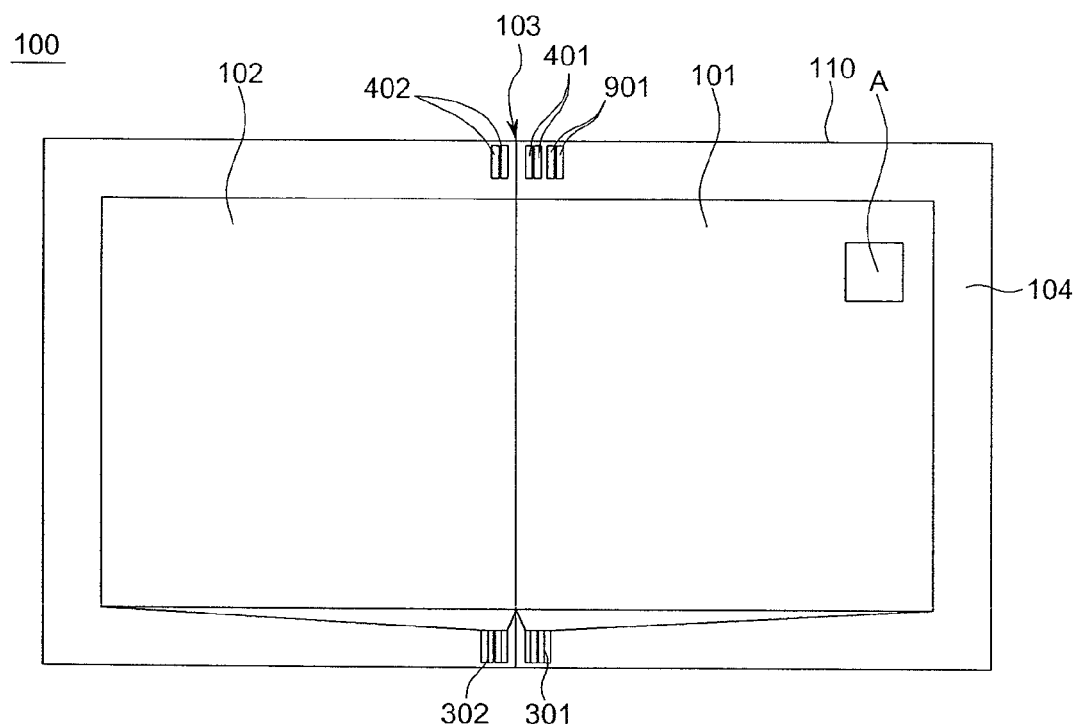
FIG. 2 is a plan view illustrating a state where the display substrate according to the first embodiment is spread out.
Figure 3:
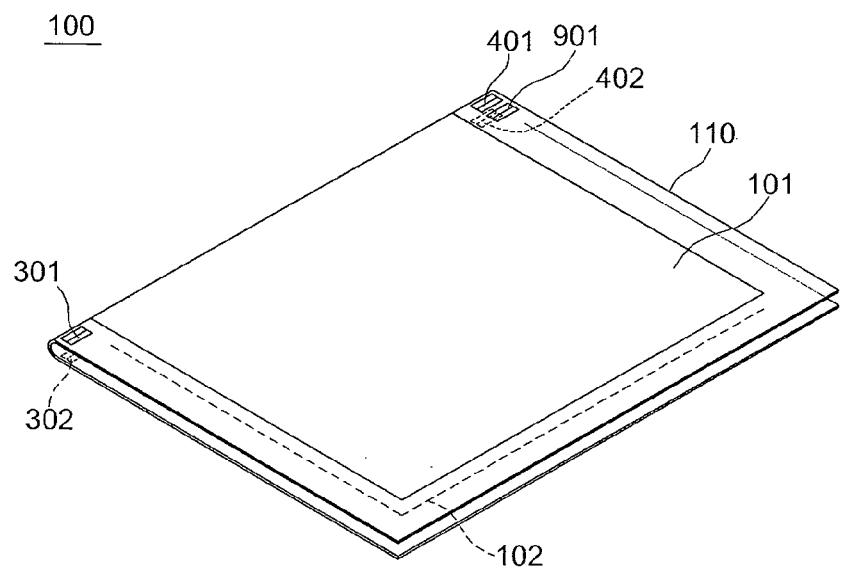
FIG. 3 is a perspective view illustrating a state where the display substrate according to the first embodiment is folded.

FIG. 1 is an exploded perspective view illustrating a display device 10 according to the first embodiment. FIG. 2 is a plan view illustrating a state where the display substrate 100 according to the first embodiment is spread out. FIG. 3 is a perspective view illustrating a state where the display substrate 100 according to the first embodiment is folded.

With reference to FIGS. 1 and 2, the display device 10 according to the first embodiment includes a display substrate 100 including display areas 101 and 102 and a non-display area 104, a driver or data driver 600 that drives the display substrate 100, and a user controller or controller unit or controller 700 that controls the driver 600.

The display device 10 is a foldable display where the display substrate 100 can be folded along a folding line 103. In FIGS. 1 and 2, it is illustrated that the display substrate 100 is folded having substantially bilateral symmetry with respect to the folding line 103, but the embodiments are not limited thereto.

The display substrate 100 includes one or more pad units 301, 302, 401, 402, and 901 disposed on one surface and/or the other surface. Further, the display substrate 100 includes a transparency adjusting layer 410 disposed on one surface. The transparency adjusting layer 410 will be described below.

The driver 600 includes a body 610 connected to the display substrate 100, data driving integrated circuits 621 and 622 that supply various signals and voltages for driving the display substrate 100, and connecting units 631, 632, and 633 that connect the data driving integrated circuits 621 and 622 to the pad units 301, 302, 401, 402, and 901.

The driver 600 can further include a power source supplying unit 640 that supply power and can further include at least one of an on-off switch, a camera, a communication device, a speaker, and an earphone hole as well, although not illustrated in FIG. 1.

The body 610 includes an engaging unit 611 having a slot for inserting the display substrate 100.

The data driving integrated circuits 621 and 622 can be disposed on the inside surface of the engaging unit 611. Further, the coupling units 631, 632, and 633 can be disposed on both end portions of the inside surface and a center portion of the engaging unit 611. The position of the coupling units 631, 632, and 633 is not limited thereto, and can vary depending on the position of the pad units 301, 302, 401, 402, 901.

The user controller 700 can include a control body 710 and a driver connecting unit 720 and one or more control switches 751, 752, 753, and 754 disposed on the control body 710. Although not illustrated in FIG. 1, the user controller 700 can include at least one of a camera, a communication device, a speaker, and an earphone hole.

Further, the user controller 700 can include an operating unit, a first communication unit, a memory, and an interface for external device recognition. These will be described below (refer to FIG. 9).

The user controller 700 is detachable from the driver 600 and connected to the driver 600 through a driver connecting unit 720 of the control body 710. The driver connecting unit 720 functions as a connecting member for physically connecting the user controller 700 to the driver 600 and includes a plurality of wirings (not illustrated) that electrically connect the user controller 700 to the driver 600.

The user controller 700 includes one or more control switches 751, 752, 753, and 754 disposed on the control body 710. These control switches include, for example, an on-off switch 751, a mode selection switch 752, a transparency adjusting switch 753, and an auxiliary switch 754.

The on-off switch 751 can be driven by a touch input. Further, the control body 710 is equipped with a user recognition means, and thus the user controller 700 can recognize a user, such that the on-off switch 751 can be driven. As an example of the user recognition, there is a fingerprint verification means (not illustrated).

The mode selection switch 752 can determine a mode of the display substrate 100, such as a display mode, a transparent mode, or an opaque mode. The mode of the display substrate 100 can be converted according to the number of times of touching the mode selection switch 752.

The transparency adjusting switch 753 is used when adjusting transparency of the display substrate 100.

Although not illustrated in the drawings, a slot is formed on a long side of the control body 710 and fixes the display substrate 100 to the control body 710. More particularly, the slot of the control body 710 can be formed to fix the folded display substrate 100 to the control body 710.

The display device 10 includes a cap member 860 connected to the control body 710 and a fixing clip 870 that fixes the display substrate 100 in a folded up state.

The control body 710 can be coupled to the cap member 860 through the slot 711 formed on the side portion. That is, the slot 711 and a protrusion 861 of the cap member 860 are coupled to each other, such that the cap member 860 can be fixed to the control body 710. Although not illustrated in the drawings, the cap member 860 can include a securing member. The securing member of the cap member 860 can prevent the display substrate 100 from being detached from the control body 710.

In addition, the cap member 860 can include a portable memory. Wirings are formed on the protrusion 861 and the slot 711, such that the cap member 860 and the control body 710 can be electrically connected. For example, the slot 711 can function as an interface of the user controller 700.

The fixing clip 870 fixes the display substrate 100 when folded up. The fixing clip 870 has a slot 872, and thus end portions of the display substrate 100 can be fixed together by the slot 872. The fixing clip 870 can include a securing member (not illustrated). The securing member of the fixing clip 870 can prevent the folded display substrate 100 from being spread out.

The fixing clip 870 includes a fingerprint recognition unit 871. The fingerprint recognition unit 871 plays a role in verifying whether a user touching the fixing clip 870 is the authentic user. The operation of the fingerprint recognition unit 871 will be described below (refer to FIG. 9).

FIG. 2 is a plan view illustrating a state where the display substrate 100 is spread out. FIG. 3 is a perspective view illustrating a state where the display substrate 100 is folded.

With reference to FIGS. 2 and 3, the display substrate 100 can be folded along the folding line 103.

The display substrate 100 includes a substrate body 110 including display areas 101 and 102 and a non-display area 104. The display areas 101 and 102 can be divided into a first display area 101 and a second display area 102 with respect to the folding line 103.

The first and second display areas 101 and 102 are display areas divided with respect to the folding line 103, for ease of description. The first and second display areas 101 and 102 can be continuous or can be two separate display areas. A plurality of display elements 210 are disposed on the first and second display areas 101 and 102 of the substrate body 110 in order to display images.

The folding line 103 is formed at the substantially center portion of the display substrate 100; however, the embodiments are not limited thereto.

The pad units 301, 302, 401, 402, and 901 are disposed on the non-display area 104. The pad units 301, 302, 401, 402, and 901 are electrically connected to the driver 600 and transmit a plurality of signals and voltages to the display substrate 100. Although the position of the pad units 301, 302, 401, 402, and 901 is determined without limitation, the pad units 301, 302, 401, 402, and 901 can be formed close to the folding line 103 in consideration of a mechanical connection with the driver 600.

In some embodiments, the pad units can be divided into first pad units 301 and 302 electrically connected to the display elements 210 and second pad units 401 and 402 electrically connected to the transparency adjusting layer 410 described below. However, the embodiments are not limited thereto, and thus a third pad unit 901 can be further provided.

In addition, in FIGS. 2 and 3, the pad units 301, 302, 401, 402, and 901 are depicted as being separated. However, the first pad units 301 and 302 can be one pad unit physically coupled to each other and the second pad units 401 and 402 can also be one pad unit physically coupled to each other.

Further, although not illustrated in the drawings, connecting wirings can be formed between the first pad units 301 and 302 and the first and second display areas 101 and 102 in order to connect the first pad units 301 and 302 and the respective display elements 210. In addition, connecting wirings can be formed between the second pad units 401 and 402 and the transparency adjusting layer 410.

Figure 4:
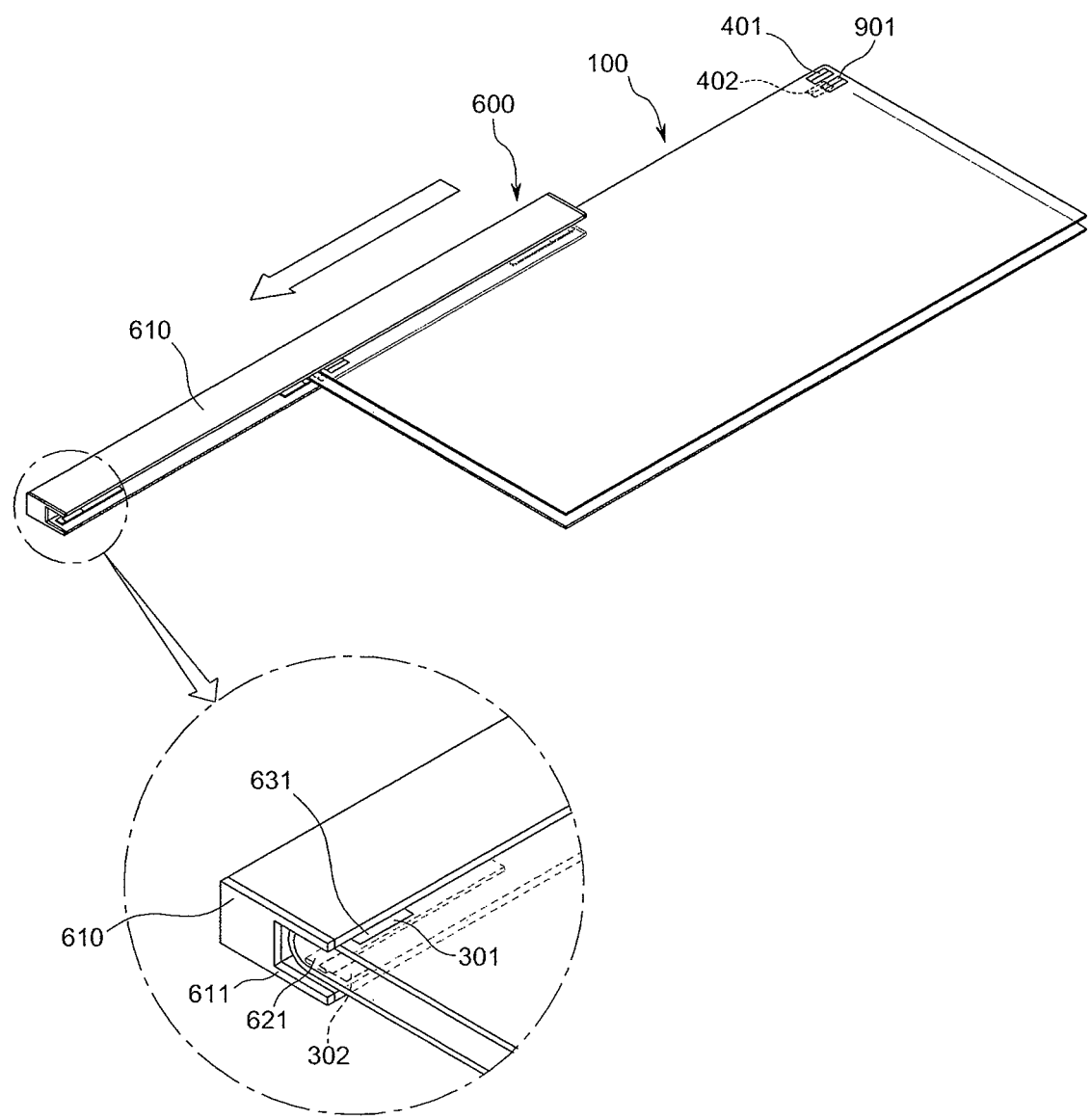
FIG. 4 is a perspective view illustrating a state where the folded display substrate is coupled to a driver.
Figure 5:
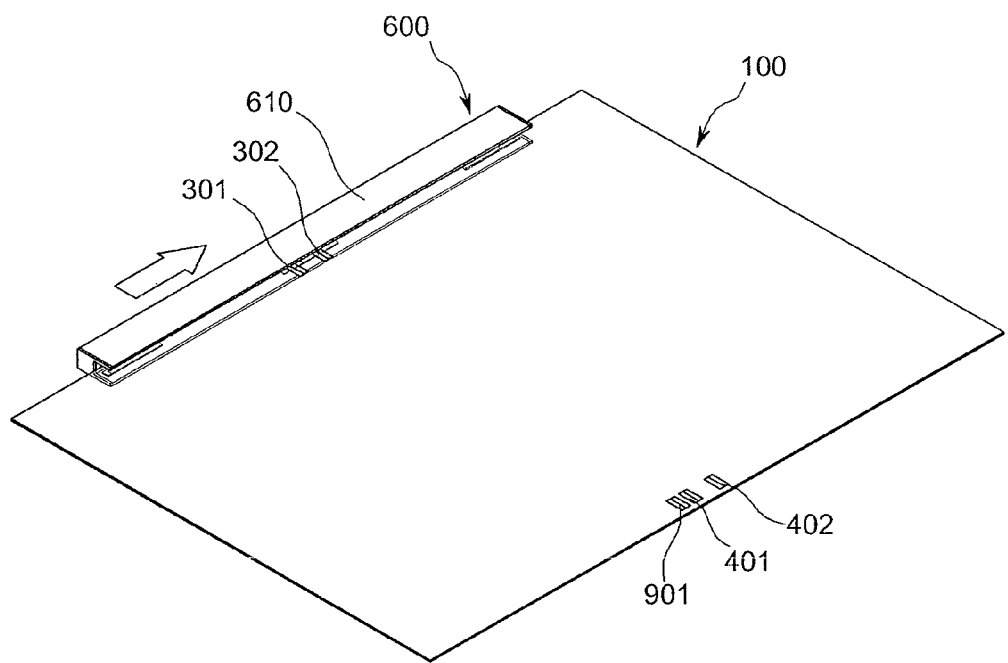
FIG. 5 is a perspective view illustrating a state where the spread display substrate is coupled to a driver.

FIG. 4 is a perspective view illustrating a state where the display substrate 100 is coupled to the driver 600. FIG. 5 is a perspective view illustrating a state where the display substrate 100 is coupled to the driver 600.

With reference to FIGS. 4 and 5, the length of the body 610 is substantially the same as the length of one side of the display substrate 100. In FIG. 4, the length of the body 610 is substantially the same as the length of the short side of the display substrate 100.

As illustrated in FIGS. 4 and 5, the display substrate 100 are engaged to the engaging unit 611 in a sliding manner having a predetermined engagement direction substantially parallel to the short side of the display substrate. Further, the display substrate 100 can be engaged to the engaging unit 611 in an inserting manner.

For example, the display substrate 100 can be folded and engaged with the body 610 (refer to FIG. 4) or can be spread out and engaged with the body 610 (refer to FIG. 5). In this example, the pad units 301, 302, 401, 402, and 901 are electrically connected to the connecting units 631, 632, and 633.

When the display substrate 100 is engaged with the body 610 in a folded state, an area of the display substrate 100 is reduced, and thus the display device 10 becomes easy to carry. When the display substrate 100 is engaged with the body 610 in a spread state, the display device 10 can provide a large sized screen.

With reference to FIG. 4, when the display substrate 100 is engaged with the engaging unit 611 in a folded state, the first pad units 301 and 302 disposed on the display substrate 100 are connected to the first connecting unit 631 disposed on one side of the engaging unit 611 and the second pad units 401 and 402 are connected to the second connecting unit 633 disposed on the other end of the engaging unit 611.

Further, referring to FIG. 5, when the display substrate 100 is engaged with the engaging unit 611 in a spread state, the first pad units 301 and 302 are connected to the third connecting unit 632.

Figure 6:
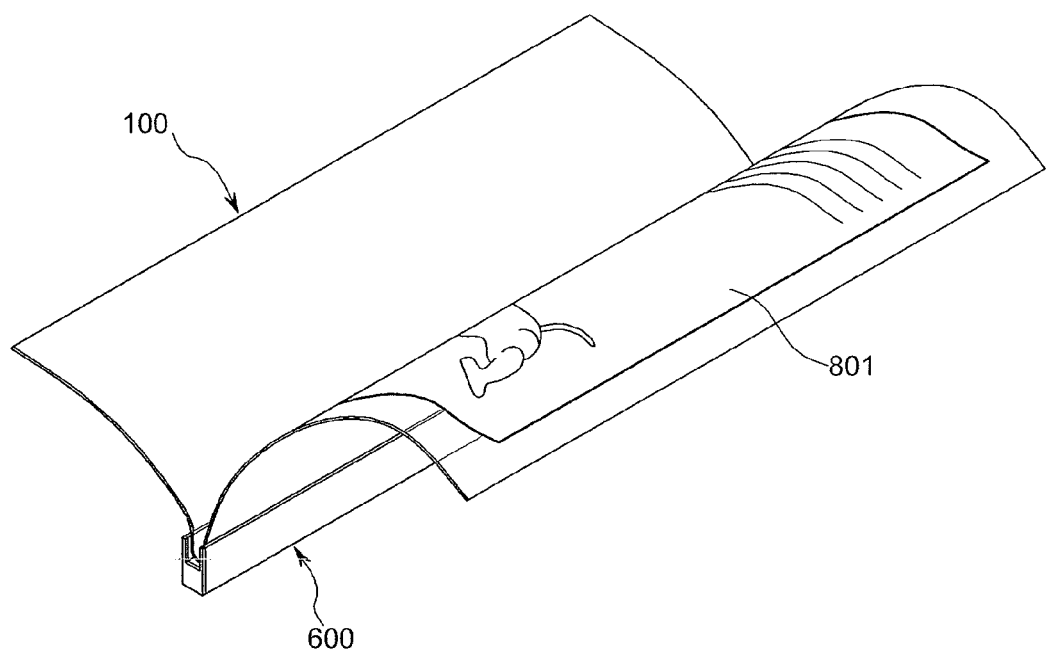
FIG. 6 is a perspective view illustrating a state where a piece of paper is inserted in the folded portion of the display substrate.

FIG. 6 is a perspective view illustrating a state where a piece of paper is inserted in the folded portion of the display substrate 100. When the folded display substrate 100 is engaged with the body 610, a space is formed inside the folded portion and thus an element having a sheet form, such as paper 801, can be inserted therein.

Figure 7:
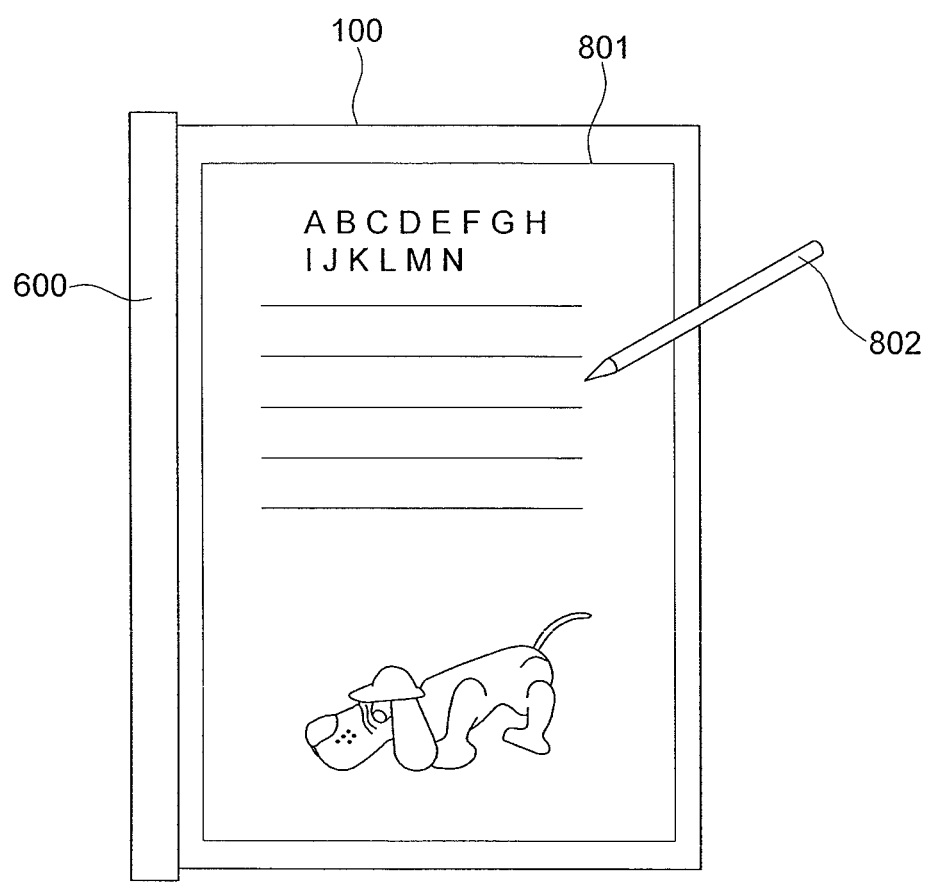
FIG. 7 is a front view illustrating a state where a piece of paper is inserted in the folded portion of the display substrate.

FIG. 7 is a front view illustrating a state where the paper 801 is inserted in the folded portion. FIG. 7 illustrates the display device 10 viewed from the first display area 101. In this case, writing or drawing on the first display area 101 can be performed by using a stylus pen 802. For this purpose, a touch sensor can be disposed on the display substrate 100 and the touch sensor can recognize the trace of the stylus pen 802. The stylus pen 802 can be mechanically fixed to the driver 600.

Figure 8:
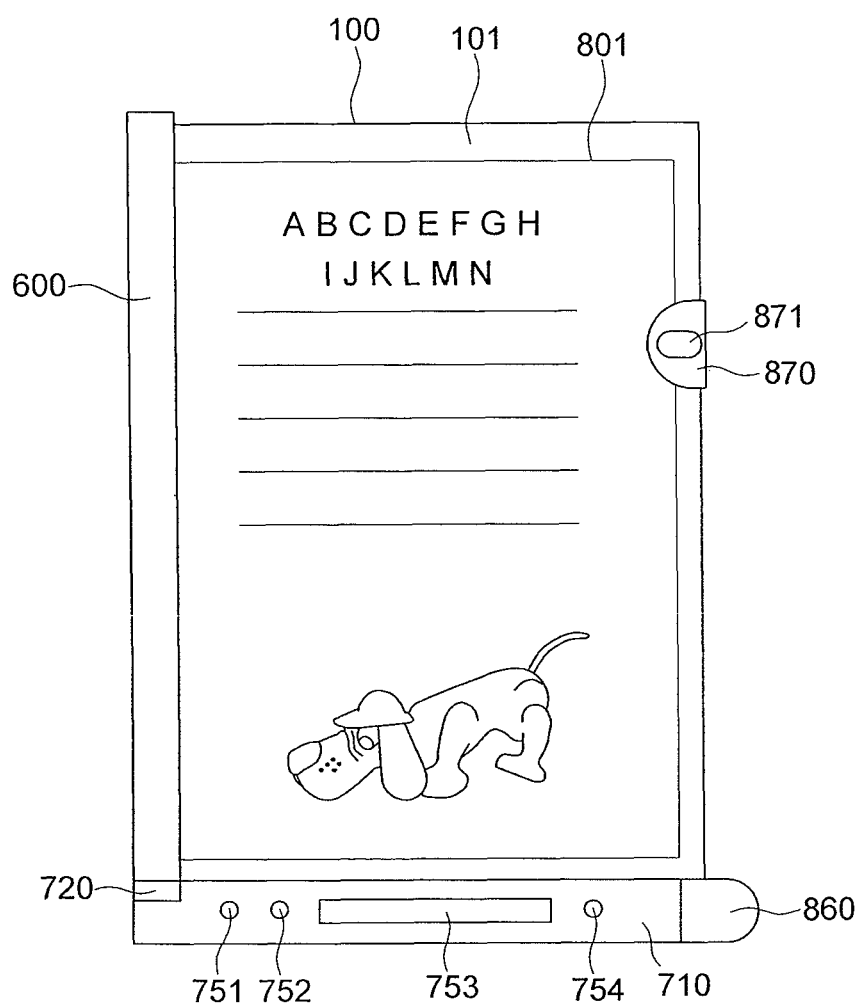
FIG. 8 is a plan view illustrating a state where a piece of paper is inserted in and fixed to the folded portion of the display substrate.

FIG. 8 is a plan view illustrating a state where a piece of paper is inserted in and fixed to the folded portion. In this example, the folded display substrate 100 and the paper 801 inserted therein are fixed together by the driver 600, the control body 710 of the user controller 700, and the fixing clip 870. When the fixing clip 870 is coupled to the two end portions of the folded display substrate 100, the display substrate 100 is not spread out. Further, when the securing member arranged on the fixing clip 870 is driven, the display substrate 100 is locked in a folded state.

Figure 9:
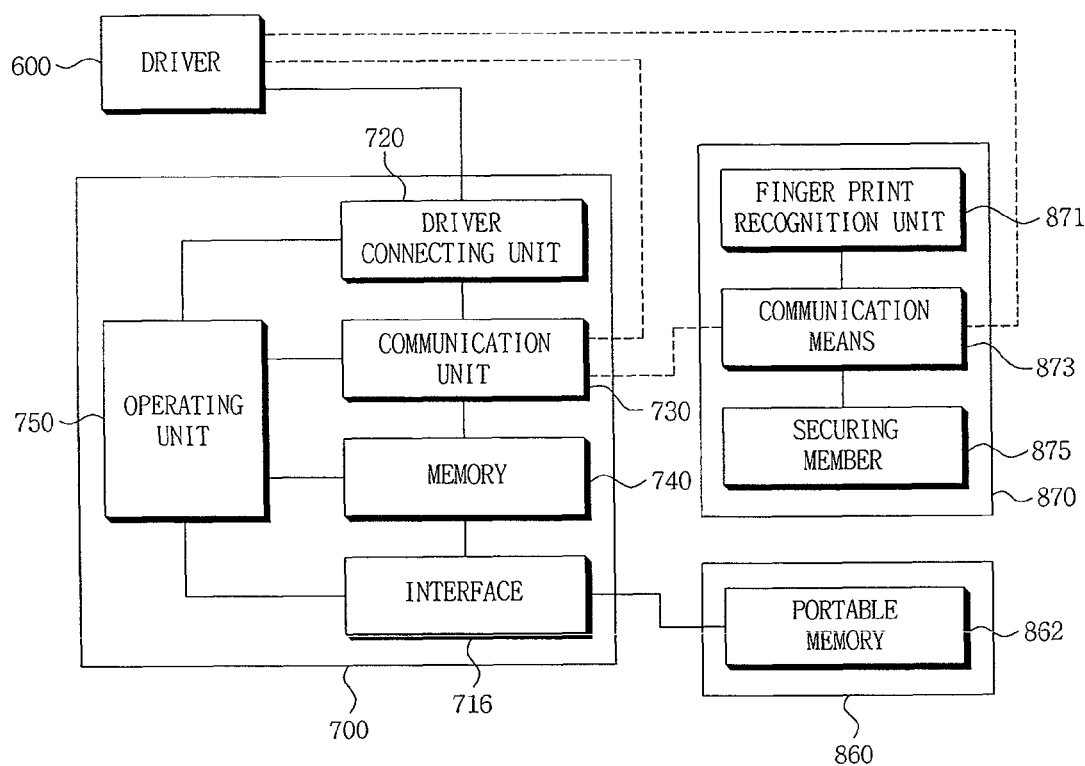
FIG. 9 is a block diagram of a user controller and peripheral devices.

FIG. 9 is a block diagram of the user controller and peripheral devices.

The user controller 700 includes a first communication unit 730, a memory 740, and an operating unit or operating system 750 other than the driver connecting unit 720 and an interface 716 that connects the external devices.

The user controller 700 exchanges information with the driver 600 through the driver connecting unit 720 and/or the first communication unit 730.

The memory 740 can store information about the operation of the display devices. For example, the memory 740 stores the user recognition information, e.g., biometric recognition, such as fingerprint information of users.

The interface 716 connects a portable memory 862 provided in the cap member 860 to the user controller 700.

The operating unit 750 processes information input to the user controller 700.

Further, the fixing clip 870 includes a second communication unit 873.

With the second communication unit 873, the fixing clip 870 can exchange information with the driver 600 and the user controller 700.

For example, the fingerprint recognition unit 871 recognizes the fingerprint of a user and transmits the fingerprint information to the second communication unit 873, the second communication unit 873 transmits the fingerprint information to the first communication unit 730, and then the operating unit 750 compares the fingerprint information transmitted to the user controller 700 with the fingerprint information of the authentic user stored in the memory 740. When the fingerprint information transmitted from the fingerprint recognition unit 871 matches the fingerprint information of the user stored in the memory 740, the operating unit 750 can operate the on-off switch 751. When the on-off switch 751 is not operated, the display device 10 is not driven. Accordingly, only when the on-off switch 751 is operated, the display device 10 is driven.

Further, when the fingerprint information transmitted from the fingerprint recognition unit 871 matches the fingerprint information stored in the memory 740, the user controller 700 can transmit the information to the fixing clip 870 through the first communication unit 730, such that the securing member 875 can be unlocked. When the securing member 875 is unlocked, the fixing clip 870 is unlocked from the display substrate 100, such that the display substrate 100 can be spread out.

Figure 10:
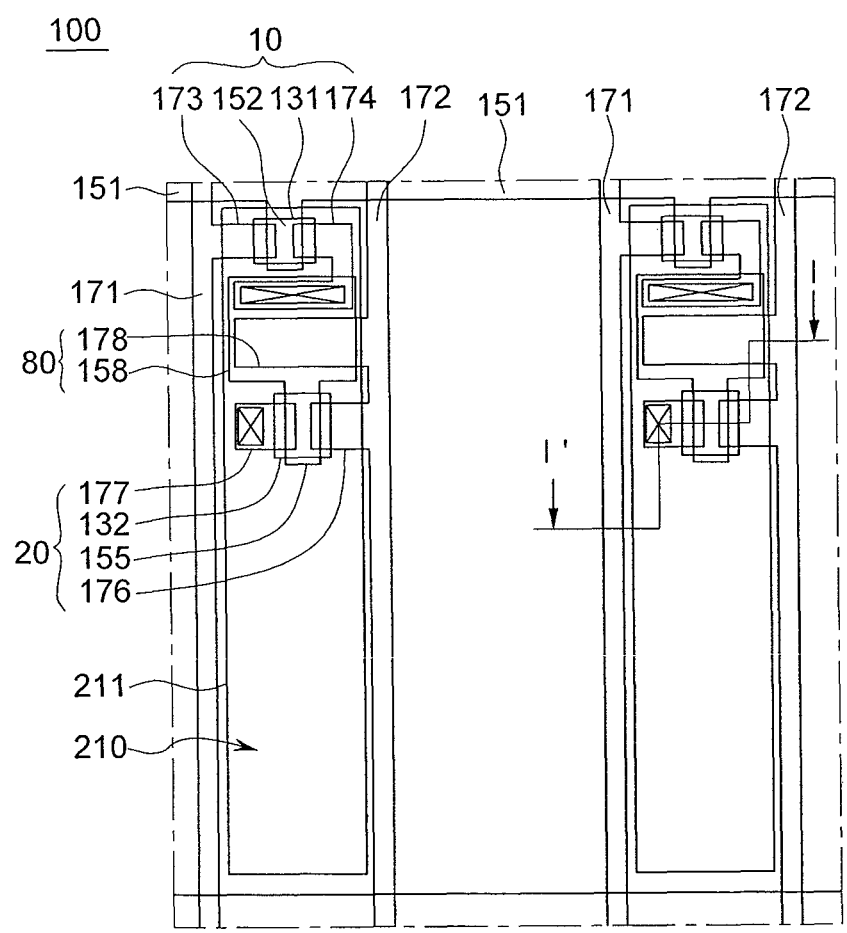
FIG. 10 is a partial plan view enlarging an "A" part of FIG. 2.
Figure 11:
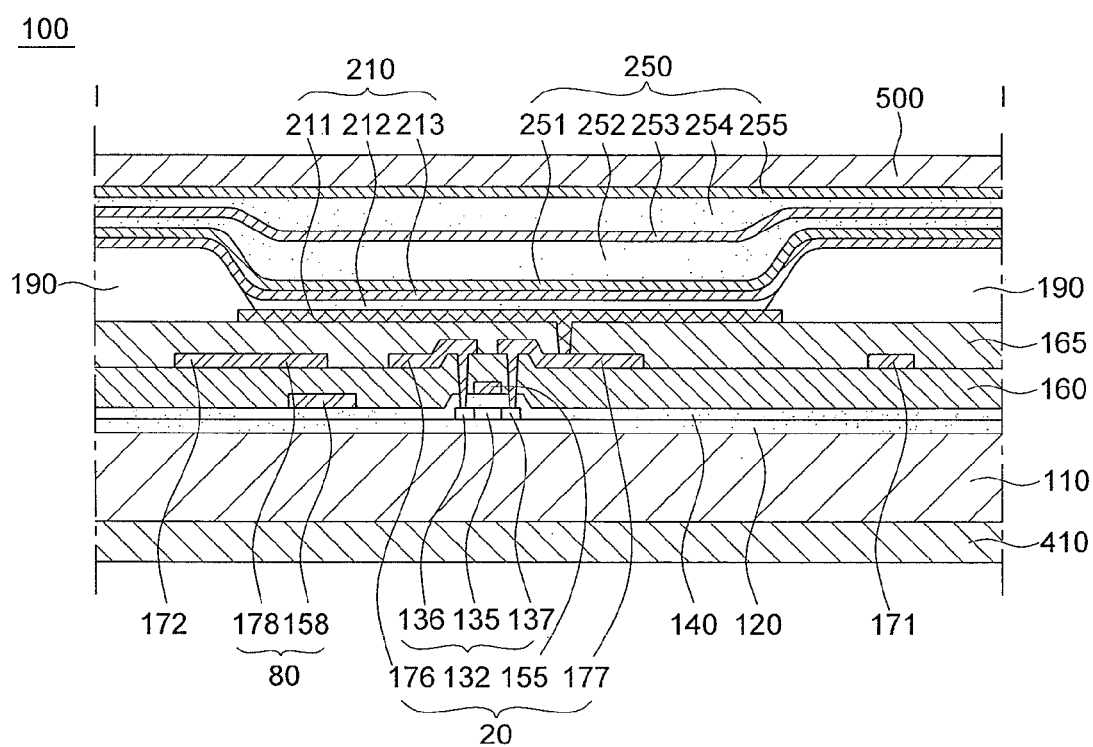
FIG. 11 is a cross-sectional view taken along line I-I' of FIG. 10.

FIG. 10 is a partial plan view enlarging an "A" part of FIG. 2. FIG. 11 is a cross-sectional view taken along line I-I' of FIG. 10.

With reference to FIGS. 10 and 11, the display substrate 100 includes a plurality of pixels including a switching thin film transistor (TFT) 10, a driving TFT 20, a capacitor 80, and an organic light-emitting diode (OLED) 210. The OLED 210 can be applied to a flexible display device 10 as the display element because it can be formed at relatively low temperatures, have low power consumption, and exhibit high luminance. Herein, a pixel refers to the smallest unit for displaying an image and the display substrate 100 displays an image using a plurality of pixels.

In addition, one pixel is depicted as having two TFTs and a capacitor in the accompanying drawings; however, the embodiments are not limited thereto. Thus, the pixel can have many different configurations including three or more TFTs, two or more capacitors, and additional wirings.

The display substrate 100 includes a gate line 151 on one surface of the substrate body 110 and a data line 171 and a common power source line 172 insulated from and intersecting the gate line 151. A pixel is generally defined by the gate line 151, the data line 171, and the common power source line 172, but is not limited thereto. The pixel can also be defined by a black matrix or a pixel defining layer.

The substrate body 110 can be formed of flexible materials, such as plastics. For example, the substrate body 110 includes at least one selected from a group including kapton, polyethersulphone (PES), polycarbonate (PC), polyimide (PI), polyethyleneterephthalate (PET), polyethylenenaphthalate (PEN), polyacrylate (PAR), and fiber reinforced plastic (FRP).

Further, the substrate body 110 has a thickness of about 5 µm to about 200 µm. In some embodiments, when the substrate body 110 has a thickness less than 5 µm, the substrate body 110 does not stably support the OLED 210. In some embodiments, when the substrate body 110 has a thickness more than 200 µm, the characteristic of the flexibility of the substrate body 110 can deteriorate. However, depending on embodiments, the thickness can be less than about 5 µm or greater than about 200 µm.

A buffer layer 120 is disposed on the substrate body 110. The buffer layer 120 can prevent infiltration of undesirable elements and planarize a surface. The buffer layer 120 can be formed of suitable materials for planarizing and/or preventing infiltration. For instance, the buffer layer 120 can be formed of any one of the followings: a silicon nitride (SiNx) layer, a silicon oxide (SiO2) layer, and a silicon oxynitride (SiOxNy) layer. However, the buffer layer 120 is not necessary and can be omitted depending on kinds of the substrate body 110 and process conditions thereof.

A switching semiconductor layer 131 and a driving semiconductor layer 132 are disposed on the buffer layer 120. The switching semiconductor layer 131 and the driving semiconductor layer 132 can be formed of one of oxide semiconductors, such as a polycrystalline silicon film, an amorphous silicon film, Indium-Galuim-Zinc Oxide (IGZO), and Indium Zinc Tin Oxide (IZTO). For instance, when the driving semiconductor layer 132 illustrated in FIG. 11 is formed of the polycrystalline silicon film, the driving semiconductor layer 132 can include a channel region 135 that is not doped with impurities, and p+ doped source and drain regions 136 and 137 on both sides of the channel region 135.

A gate insulating layer 140 is disposed on the switching semiconductor layer 131 and the driving semiconductor layer 132. The gate insulating layer 140 can include at least one of tetraethylorthosilicate (TEOS), silicon nitride (SiNx), and silicon oxide (SiO2).

A gate wire including gate electrodes 152 and 155 is disposed on the gate insulating layer 140. The gate wire includes a gate line 151, a first capacitor plate 158, and other lines. Further, the gate electrodes 152 and 155 are formed to overlap at least parts of the semiconductor layers 131 and 132, for example, channel regions. The gate electrodes 152 and 155 can prevent the channel region from being doped with impurities when source and drain regions 136 and 137 are doped with impurities in the process of forming the semiconductor layers 131 and 132.

The gate electrodes 152 and 155 and the first capacitor plate 158 are disposed on the same layer and formed of substantially the same metal material. The gate electrodes 152 and 155 and the first capacitor plate 158 can be formed of at least one of molybdenum (Mo), chromium (Cr), and tungsten (W).

An interlayer insulating layer 160 at least partially covers the gate electrodes 152 and 155 is disposed on the gate insulating layer 140. The interlayer insulating layer 160 can be formed of silicon nitride (SiNx), silicon oxide (SiOx) or tetraethoxysilane (TEOS) as the gate insulating layer 140; however, embodiments are not limited thereto.

A data wire including source electrodes 173 and 176 and drain electrodes 174 and 177 is disposed on the interlayer insulating layer 160. The data wire includes a data line 171, a common power source line 172, a second capacitor plate 178, and other lines. Further, the source electrodes 173 and 176 and the drain electrodes 174 and 177 are respectively connected to the source and the drain regions of the semiconductor layers 131 and 132 through a contact opening formed on the gate insulating layer 140 and the interlayer insulating layer 160.

Accordingly, the switching TFT 10 includes the switching semiconductor layer 131, the switching gate electrode 152, the switching source electrode 173, and the switching drain electrode 174. The driving TFT 20 includes the driving semiconductor layer 132, the driving gate electrode 155, the driving source electrode 176, and the driving drain electrode 177. Configurations of the TFTs 10 and 20 are not limited to the above embodiments.

In addition, the capacitor 80 includes the first capacitor plate 158 and the second capacitor plate 178 with the interlayer insulating layer 160 interposed therebetween.

The switching TFT 10 can function as a switching element that selects pixels to perform light emission. The switching gate electrode 152 is electrically connected to the gate line 151. The switching source electrode 173 is electrically connected to the data line 171. The switching drain electrode 174 is spaced apart from the switching source electrode 173 and electrically connected to the first capacitor plate 158.

The driving TFT 20 applies a driving power to the pixel electrode 211, which allows a light-emitting layer 212 of the OLED 210 in the selected pixel to emit light. The driving gate electrode 155 is electrically connected to the first capacitor plate 158. The driving source electrode 176 and the second capacitor plate 178 are respectively electrically connected to the common power source line 172. The driving drain electrode 177 is electrically connected to the pixel electrode 211 through a contact hole.

With the above described configuration, the switching TFT 10 is operated by a gate voltage applied to the gate line 151 and transmits a data voltage applied to the data line 171 to the driving TFT 20. A voltage equivalent to a difference between a common voltage applied from the common power source line 172 to the driving TFT 20 and the data voltage transmitted from the switching TFT 10 is stored in the capacitor 80. And current corresponding to the voltage stored in the capacitor 80 flows to the OLED 210 through the driving TFT 20, such that the OLED 210 can emit light.

A planarization layer 165 is formed so as to cover the data wire patterned on the same layer including the data line 171, the common power source line 172, the source electrodes 173 and 176, the drain electrodes 174 and 177, and the second capacitor plate 178 disposed on the interlayer insulating layer.

The planarization layer 165 can planarize a surface of the OLED 210 by eliminating or reducing layers of the OLED 210 that will be formed thereon so as to increase luminance efficiency. The planarization layer 165 can be made of at least one of the following materials: polyacrylate resins, epoxy resins, phenolic resins, polyamide resins, polyimide resin, unsaturated polyester resin, polyphenylen ether resin, polyphenylene sulfide resin, and benzocyclobutene (BCB).

The pixel electrode 211 is disposed on the planarization layer 165. The pixel electrode 211 is electrically connected to the drain electrode 177 through the contact hole formed on the planarization layer 165.

A pixel defining layer 190 is formed on the planarization layer 165 and defines a pixel area by exposing at least a part of the pixel electrode 211. The pixel electrode 211 is formed to correspond to the pixel area. The pixel defining layer 190 can be formed of resins, such as polyacrylate resins and polyimide resins.

A light-emitting layer 212 is disposed on the pixel electrode 211 in the pixel area and a common electrode 213 is disposed on the pixel defining layer 190 and the light-emitting layer 212. The light-emitting layer 212 can be formed of low molecular weight organic materials or high molecular weight organic materials. At least one of a hole injection layer (HIL) and a hole transporting layer (HTL) can be further formed between the pixel electrode 211 and the light-emitting layer 212. At least one of an electron transporting layer (ETL) and an electron injection layer (EIL) can be further formed between the light-emitting layer 212 and the common electrode 213.

The pixel electrode 211 and the common electrode 213 can be formed as one of the followings: a transmissive electrode, a transflective electrode, and a reflective electrode.

A transmissive electrode can be formed of transparent conductive oxide (TCO). As examples of the transparent conductive oxide (TCO), there are indium tin oxide (ITO), indium zinc oxide (IZO), zinc oxide (ZnO), and indium oxide (In2O3).

A transflective or a reflective electrode can be formed of metal, such as magnesium (Mg), silver (Ag), gold (Au), calcium (Ca), lithium (Li), chromium (Cr), aluminum (Al), and copper (Cu), or a metal alloy thereof. For example, whether an electrode is a transflective type or a reflective type depends on the thickness of the electrode. Generally, the transflective electrode has a thickness of about 200 nm or less, and the reflective electrode has a thickness of about 300 nm or more. As the thickness of the transflective electrode decreases, the transmittance of light and the resistance become higher. On the contrary, as the thickness of the transflective electrode increases, the transmittance of light decreases.

Further, the transflective and the reflective electrodes can have a multilayer structure including a metal layer formed of metal or metal alloys and a TCO layer laminated on the metal layer.

The display substrate 100 emits light to both sides, and thus an image can be displayed by emitting light toward the pixel electrode 211 and the common electrode 213. Therefore, the first electrode 211 and the second electrode 213 are formed in a transmissive type or a transflective type.

A thin film encapsulation layer 250 is disposed on the second electrode 213. The thin film encapsulation layer 250 includes one or more inorganic layers 251, 253, and 255 and one or more organic layers 252 and 254. Further, the thin film encapsulation layer 250 has a structure where inorganic layers 251, 253, and 255 and organic layers 252 and 254 are alternately laminated. In FIG. 11, the thin film encapsulation layer 250 includes three inorganic layers 251, 253, and 255 and two organic layers 252 and 254; however, the embodiments are not limited thereto.

The thin film encapsulation layer 250 can be formed having a thickness of 10 μm or less. Therefore, the display substrate 100 can be formed having a very thin overall thickness. Thus, by applying the thin film encapsulation layer 250, the characteristic of flexibility of the display substrate 100 can be maximized.

A touch screen panel 500 is disposed on the thin film encapsulation layer 250. The presence and location of an input touch can be detected by the touch screen panel 500. For example, a user inputs touch information to the touch screen panel 500 by using the stylus pen 802, a finger of the user, or the like.

A transparency adjusting layer 410 is disposed on the other surface of the substrate body 110, that is, the opposite side from the surface where the OLED 210 is disposed. The transparency adjusting layer 410 can adjust transparency of the display substrate 100, such that the display substrate 100 can be viewed to be transparent or opaque. The transparency adjusting layer 410 can include liquid crystal molecules. In this case, transparency of the transparency adjusting layer 410 can be adjusted by adjusting the arrangement of the liquid crystal molecules.

The transparency adjusting layer 410 is electrically connected to the second pad units 401 and 402, such that the transparency adjusting layer 410 can be operated. For this purpose, connecting lines can be disposed between the second pad units 401 and 402 and the transparency adjusting layer 410.

Figure 12:
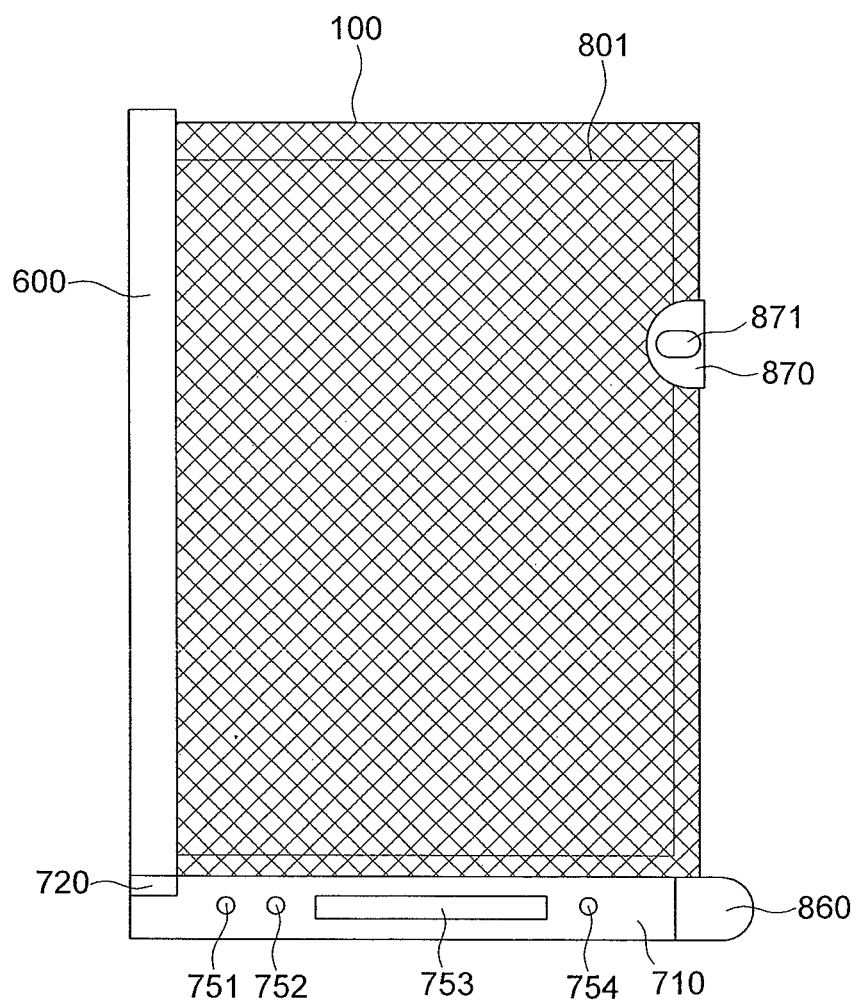
FIG. 12 is a plan view illustrating a state where transparency of the display substrate is lowered.

FIG. 12 is a plan view illustrating a state where the transparency of the display substrate 100 is lowered.

The transparency adjusting switch 753 disposed on the control body 710 is adjusted in order to adjust the transparency of the transparency adjusting layer 410, such that the transparency of the display substrate 100 can be adjusted.

As illustrated in FIG. 12, when the transparency adjusting layer 410 becomes opaque, the paper 801 is not viewed from the outside, such that security can be maintained and the privacy can be protected.

Figure 13:
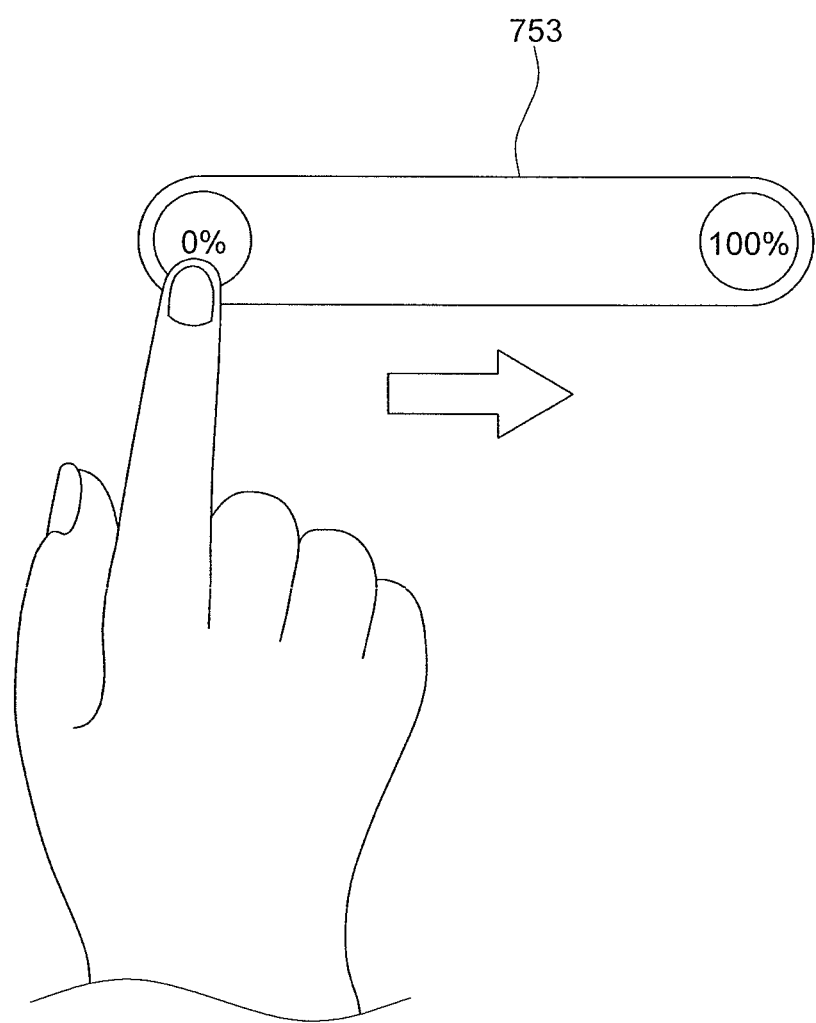
FIG. 13 is a plan view showing a transparency adjusting switch.

FIG. 13 is a plan view showing the transparency adjusting switch 753 disposed on the control body 710 according to an embodiment. The transparency adjusting switch 753 includes a touch sensor. When a user puts a finger on the transparency adjusting switch 753 and moves the finger from left to right, the transparency adjusting switch 753 recognizes the movement of the finger as a control signal and the control signal is transmitted to the driver 600 via the driver connecting unit 720, such that the driver 600 drives the transparency adjusting layer 410. In this case, the transparency of the transparency adjusting layer 410 can be adjusted in a range of 0% to 100%. Herein, the transparency of 0% to 100% is defined per display device, and thus can differ from the optical transparency.

Hereinafter, with reference to FIGS. 14 to 17, a second embodiment will be described.

Figure 14:
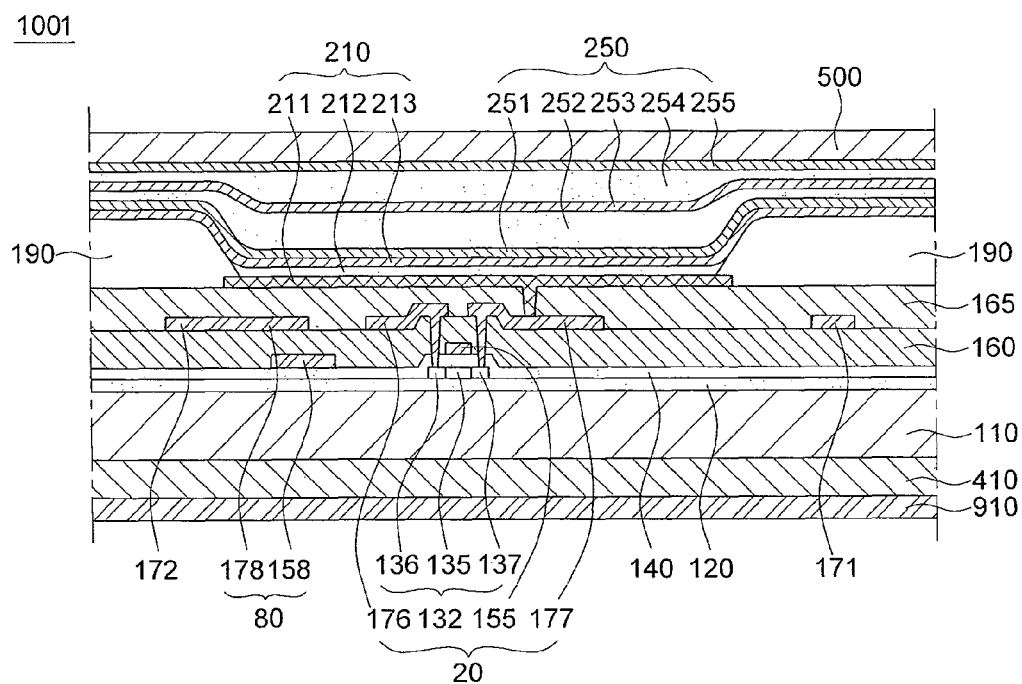
FIG. 14 is a cross-sectional view showing a display substrate applied in a display device according to a second embodiment

FIG. 14 is a cross-sectional view showing a display substrate 1001 applied in a display device 11 according to the second embodiment.

The display substrate 1001 includes a film scanner 910 disposed on at least one surface of the substrate body 110. In FIG. 14, the film scanner 910 is disposed on a transparency adjusting layer 410. The film scanner 910 is electrically connected to a third pad unit 901 that is a pad unit for the film scanner. Although not illustrated in the drawings, connecting lines are formed between the third pad unit 901 and the film scanner 910.

When a light source is required for the scanning process, light-emitting elements 210 of the display substrate 1001 can function as a light source. Since the display substrate 1001 emits light to both sides, the scanning object can be irradiated with the light.

Figure 15:
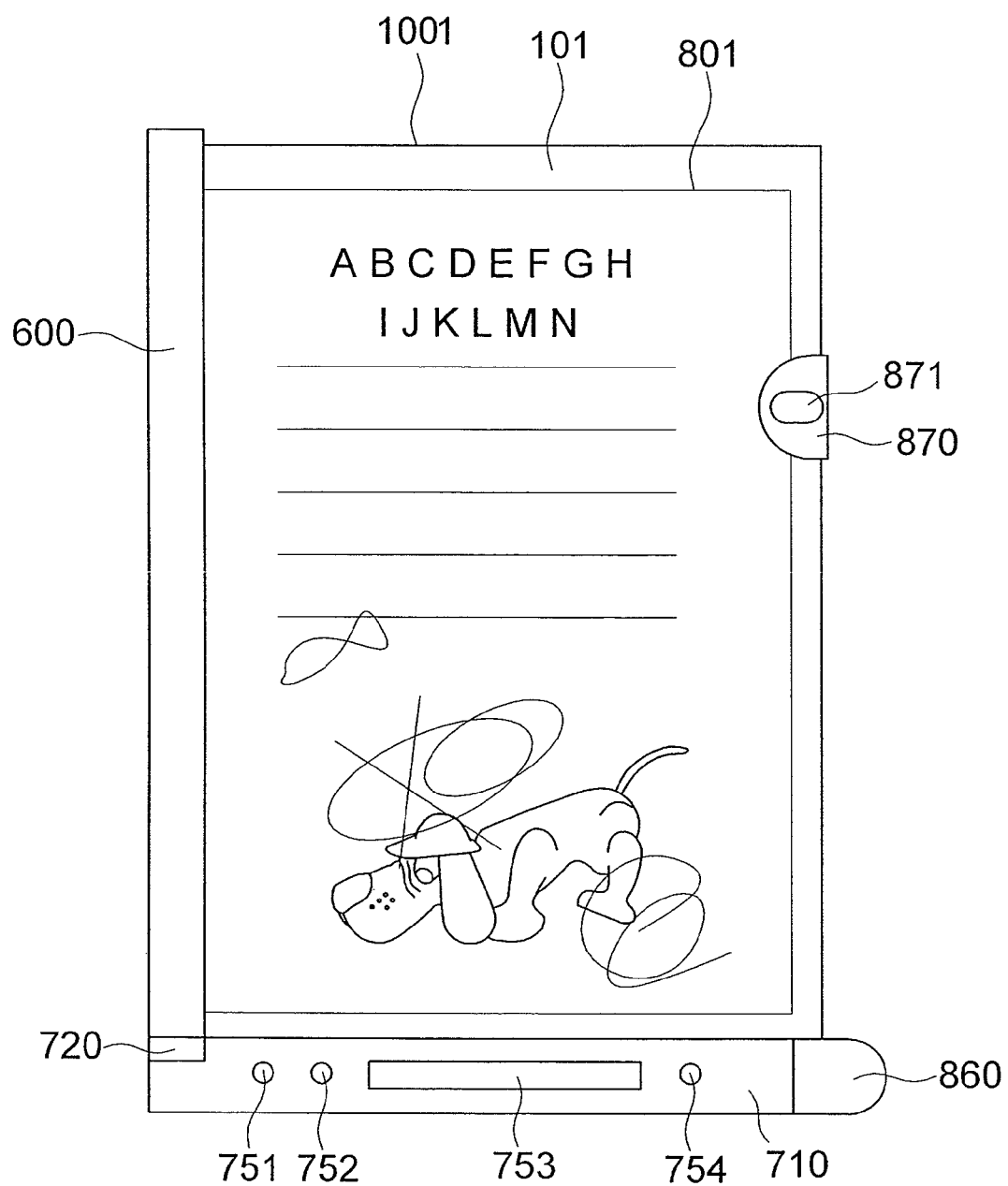
FIG. 15 is a plan view illustrating a scanning object

FIG. 15 is a plan view illustrating a scanning object. Herein, the scanning object is a paper 801. The scanning process is carried out in a state where the paper 801 is fixed in the folded space of the display substrate 1001.

In this case, an auxiliary switch 754 disposed on the control body 710 functions as a scanning switch. A scanning command signal is generated when a user touches the auxiliary switch 754. The generated scanning command signal is transmitted to the driver 600 via the driver connecting unit 720 and the driver 600 drives the film scanner 910 according to the input scanning command signal. In this case, one of the data driving integrated circuits 622 of the driver 600 can perform the scanning process.

The film scanner 910 includes a photo sensor. As an example of the photo sensor, there is a photodiode (not illustrated). The photodiode recognizes the light reflected from a paper 801, such that the scanning process can be performed. For eaxmple, the film scanner 910 is driven according to the scanning command signal and then the photo sensor recognizes the light reflected from the paper 801, and thus the scanning information is generated. The scanning information is transmitted to the driver 600 via the third pad unit 901 and finally transmitted to the user controller 700 via the driver connecting unit 720, thereby completing the scanning process.

Hereinafter, an image combination will be described with reference to FIGS. 16 and 17.

Figure 16:
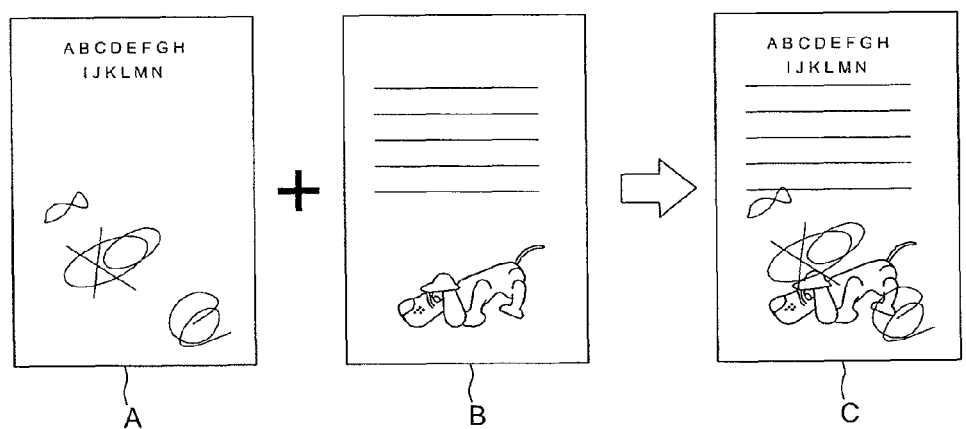
FIG. 16 is a schematic conceptual image for explaining a combination of scanning information and touch information.

FIG. 16 is a schematic conceptual image for explaining a combination of scanning information and touch information. FIG. 17 is a block diagram for explaining a combination of scanning information and touch information.

With reference to FIG. 16, the touch information A regarding drawings or characters drawn or written on the surface of a first display area 101 and the scanning information B of the paper 801 obtained by the scanning process using the film scanner 910 are combined, thereby producing a combined image C.

Figure 17:
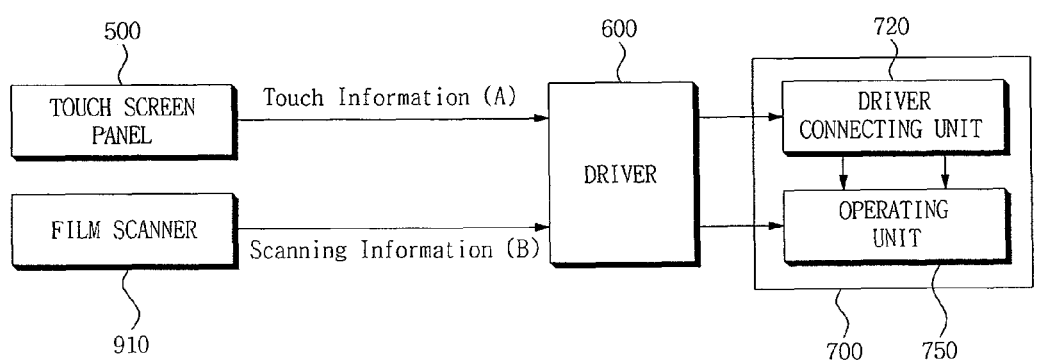
FIG. 17 is a block diagram for explaining a combination of scanning information and touch information.

For example, as illustrated in FIG. 17, when a user draws a picture or writes letters on the surface of the first display area 101, a touch screen panel 500 recognizes this and generates the touch information A. The generated touch information A is transmitted to the user controller 700 via the driver 600 and the driver connecting unit 720. Likewise, the scanning information B is transmitted to the user controller 700 via the driver 600 and the driving user controller 720. Thus, the touch information A and the scanning information B transmitted to the user controller 700 can be combined by the operating unit 750.

As a result, when the paper 801 is formed at the bottom portion of the first display area 101 of the display device 10 or 11 and new contents are written on the external surface of the first display area 101, the contents written on the paper 801 and the contents written on the external surface of the first display area 101 can be stored together.

From the foregoing, it will be appreciated that various embodiments in accordance with the present disclosure have been described herein for purposes of illustration, and that various modifications can be made without departing from the scope and spirit of the present teachings. Accordingly, the various embodiments disclosed herein are not intended to be limiting of the true scope and spirit of the present teachings.

What is claimed is:

1. A foldable display comprising:
   a single, bendable display substrate;
   a housing having a slot, wherein the display substrate has a folded portion inserted into the slot;
   a data driver detachably connected to the display substrate; and
   a controller unit configured to control the data driver and detachably connected to the data driver,
   wherein the display substrate comprises:
   a substrate body;
   a display element formed on a first surface of the substrate body; and
   a transparency adjusting layer configured to adjust transparency of the display substrate and formed on a second surface of the substrate body, wherein the first and second surfaces are opposing each other.

2. The display of claim 1, wherein the display substrate is further configured to be engaged with the data driver.

3. The display of claim 1, wherein the display substrate is further configured to be unfolded and engaged with the data driver.

4. The display of claim 1, wherein the display substrate is further configured to transmit light via the two opposing surfaces thereof.

5. The display of claim 1, wherein the display element comprises an organic light-emitting diode (OLED).

6. The display of claim 1, wherein the transparency adjusting layer comprises liquid crystal molecules.

7. The display of claim 1, wherein the controller unit includes at least one control switch.

8. The display of claim 7, wherein the control switch comprises an on-off switch and a transparency adjusting switch.

9. The display of claim 7, wherein the controller unit comprises at least one of a camera, a communication device, a speaker, and an earphone hole.

10. A foldable display comprising:
    a foldable display substrate;
    a data driver detachably connected to the display substrate; and
    a controller unit configured to control the data driver and detachably connected to the data driver,
    wherein the display substrate comprises:
    a substrate body;
    a display element formed on a first surface of the substrate body; and
    a transparency adjusting layer configured to adjust transparency of the display substrate and formed on a second surface of the substrate body, wherein the first and second surfaces are opposing each other, and wherein the controller unit comprises an operating unit, a first communication unit, and a memory.

11. The display of claim 10 further comprising a fixing clip including a second communication unit configured to communicate data with the controller unit and a slot so as to fix the ends of the display substrate together.

12. The display of claim 11, wherein the fixing clip comprises a fingerprint recognition unit, and wherein the memory of the controller unit stores fingerprint information of a user.

13. The display of claim 1, wherein the display substrate further comprises a film scanner formed on the substrate body and configured to scan an image.

14. The display of claim 13, wherein the display substrate comprises a touch screen panel.

15. The display of claim 14, wherein the film scanner is configured to generate scanning information based on the scanned image, wherein the touch screen panel is configured to generate touch information based on objects drawn on the touch screen panel, and wherein the controller unit is configured to i) receive the scanning information and the touch information and ii) combine the scanning information and the touch information so as to display a combined image.

16. A foldable display comprising:
a foldable display substrate;
a driver configured to drive and detachably connected to the display substrate; and
a controller configured to control the driver and detachably connected to the driver,
wherein the foldable display substrate comprises:
a touch screen panel configured to generate touch information based on a user's touch; and
a film scanner configured to scan an image placed below the display substrate and generate scanning information,
wherein the controller is further configured to receive and combine the scanning and touch information so as to display a combined image on the touch screen panel.

17. The display of claim 16, wherein the display substrate further comprises:
a substrate body;
a display element formed on a first surface of the substrate body; and
a transparency adjusting layer configured to adjust transparency of the display substrate and formed on a second surface of the substrate body, wherein the first and second surfaces are opposing each other.

18. The display of claim 17, wherein the display element comprises an organic light-emitting diode (OLED), and wherein the transparency adjusting layer comprises liquid crystal molecules.

19. The display of claim 17, further comprising a fixing clip that includes i) a communication unit configured to communicate data with the controller and ii) a slot so as to fix ends of the display substrate together.

20. The display of claim 19, wherein the fixing clip comprises a fingerprint recognition unit, and wherein the memory of the controller stores fingerprint information of a user.

* * * * *